United States Patent [19]

Caprette, Jr. et al.

[11] Patent Number: 4,997,705
[45] Date of Patent: Mar. 5, 1991

[54] WINDOW FOR ACOUSTIC WAVE FORM AND METHOD FOR MAKING

[75] Inventors: Samuel J. Caprette, Jr., Chagrin Falls; Jai L. Lai, Copley; Jonathan M. Golden, Akron, all of Ohio

[73] Assignee: The B. F. Goodrich Company, Akron, Ohio

[21] Appl. No.: 865,307

[22] Filed: May 21, 1986

[51] Int. Cl.⁵ .................................................. B32B 5/06
[52] U.S. Cl. .................................... 428/302; 181/198; 181/294; 181/400; 181/402; 367/191; 428/298; 428/303; 428/332; 428/408; 428/415; 428/416; 428/423.9; 428/458; 428/465; 428/480; 428/492; 428/494
[58] Field of Search ............... 181/198, 294, 400, 402; 367/191; 428/298, 302, 303, 332, 408, 415, 416, 423.9, 458, 465, 494, 480, 492

[56] References Cited

U.S. PATENT DOCUMENTS

| | | | |
|---|---|---|---|
| 2,430,013 | 11/1947 | Hansell | 181/402 |
| 2,444,911 | 7/1948 | Benioff | 181/198 |
| 3,038,551 | 6/1962 | McCoy et al. | 181/198 |
| 3,120,875 | 2/1964 | Graner | 181/198 |
| 3,123,176 | 3/1964 | Greenberg | 181/198 |
| 3,858,165 | 12/1974 | Pegg | 181/402 |
| 3,901,993 | 8/1975 | Phillips, Jr. | 428/148 |
| 4,062,422 | 12/1977 | Phelps et al. | 181/198 |
| 4,135,037 | 1/1979 | Udipi et al. | 428/416 |
| 4,237,176 | 12/1980 | Brueggmann et al. | 181/294 |
| 4,557,784 | 12/1985 | Uekita et al. | 428/416 |

OTHER PUBLICATIONS

Technical Memorandum, Oct. 23, 1978, U.S. Naval Applied Science Laboratory.
Properties of Sandwich-Type Structures as Acoustic Windows, Hickman et al., vol. 29, No. 7, *Journal of Acoustical Society*, (p. 858).

*Primary Examiner*—Stephen J. Lechert, Jr.
*Attorney, Agent, or Firm*—David M. Ronyak; Woodrow W. Ban

[57] ABSTRACT

A laminate acoustic window for sonar systems having a pair of septa sandwiching a core therebetween, the core being made of a low shear high elongation to break material, the septa being formed of a relatively low density, high modulus material. The windows of the invention are characterizied by unusual freedom from attenuation loss over a wide frequency range. The windows are further substantially self damping and avoid thereby a generation of significant quantities of deleterious noise due to self generated vibration and transmitted vibration.

19 Claims, 2 Drawing Sheets

WINDOW FOR ACOUSTIC WAVE FORM AND METHOD FOR MAKING

FIELD OF THE INVENTION

This invention relates to windows for the passage of a desired acoustic wave form, and more specifically to such windows employed in submerged liquid service such as underwater service. More particularly, this invention relates to sonar windows such as domes for use on surface and submergible vessels in both the military and commercial arena.

BACKGROUND OF THE INVENTION

Acoustic windows such as sonar domes for use in transmitting or receiving acoustic wave form signals in a liquid environment are known. Traditionally, these windows have consisted of a single thickness of a metal such as steel that may optionally have been covered by a biologically active substance such as a rubber containing a biocide, in order that biofouling of surfaces of the window may be inhibited.

Typically such windows on an exterior surface have interfaced with a body of free liquid such as an ocean, lake or tank. Such windows, on the interior surface, traditionally have at least partially defined a chamber filled with water or another liquid. Substantial efforts have been expended to configure such windows to be acoustically "clear", that is producing a desirably low distortion and attenuation of sound wave energy being passed through the windows and, equally, a desirably low distortion of the angle characterizing the impingement of the wave energy against the window.

Such windows have been subject to certain undesirable characteristics. For example, windows made of a rigid material such as steel can generate significant quantities of acoustic noise associated with the passage of water over the window and can transmit significant quantities of acoustic noise arising from vibrational frequencies associated with the operation of machinery aboard a ship upon which a window is embodied. In addition, these relatively rigid windows can generate a significant bounce or reflection effect for acoustic wave form energy impinging upon the window surface. Such bounce can result in a substantial reduction of signals being transmitted through the window, and where reflection occurs from interior surfaces of the window during transmission of an acoustic wave form from within the chamber defined by the window, spurious or erroneous determinations of and/or making of an echo can result.

It has been suggested that alternate materials to steel or other metals be employed in the fabrication of domes. Fiber reinforced plastics (FRP) have been suggested as a suitable window material, such FRP materials have demonstrated enhanced corrosion resistance over steel but have generally been subject to many of the same difficulties characterizing steel with respect to acoustic clarity, reduction, and reflective characteristics.

Windows such as sonar domes can be required to transmit acoustic energy having a frequency ranging from about 500 hz to about 500 khz. These frequencies correspond to wavelengths of about 3 meters to about 0.003 meters in water, with the wavelengths being subject to some variation depending upon the material through which the wave form is being propagated. With traditional domes of metal or reinforced plastic, where the thickness of the material from which the dome is fabricated deviates substantially from a ½ wave length of the acoustical frequency being transmitted through the dome, reduction such as through insertion loss, that is 20 log $P_o/P_t$ where $P_o$ is the incident pressure of the wave and $P_t$ is the transmitted pressure, can become unacceptable. A sonar dome structurally must be built to withstand a particular structural loading. This construction results in an inherent thickness in the material of construction. Where this thickness substantially deviates from ½ the wavelength being transmitted an effective blindness to certain acoustic waveform frequencies can result by simple reduction of the waveform energy transmitting across the material thickness.

Naturally sonar domes are not the sole use for acoustically transparent materials; frequently it is desired that acoustic waveform energy be transmitted through a window or covered aperture in a vessel hull. The same constraints that affect performance of conventional sonar domes also may affect the acoustic performance of such windows.

Structural configurations in forming sonar domes and windows have traditionally focused material selection considerations upon elevated modulus materials, that is materials having a Young's modulus of in excess of at least about 100,000 psi ($6895 \times 10^5$ kPa) and more frequently in excess of about 1,000,000 psi ($6895 \times 10^6$ kPa). These materials generally are possessed of an elongation break characteristic approaching zero and a sound propagation velocity characteristic too elevated to be used in a desirable, thin tunable window, and the use of such rigid, high strength materials has tended to make "tuning" sonar domes and windows formed with such materials quite difficult. The properties of materials of construction for the sonar domes or windows taken together with the structural loading imposed upon such domes and windows has tended to establish the acoustic properties of the sonar dome without much residual flexibility for tuning of the properties such as clarity, reduction and the like.

A sonar dome or window, tunable to substantially reduce reduction of sound wave frequencies, upon passage through the sonar dome or window, could find substantial application in both the military and commercial areas. Equally, a dome or a window formed of one or more materials configured to reduce the reflective signals during passage of an acoustic waveform signal therethrough could find substantial utility.

Likewise, a construction for sonar domes and windows wherein the sonar dome or window is possessed of elevated self damping properties, could find substantial utility in reducing noise and spurious signals resulting from vibrations engendered as examples, by the passage of water along the sonar dome or window, or by the transmitted vibration of machinery and equipment aboard the vessel embodying the sonar dome or window.

SUMMARY OF THE INVENTION

The present invention provides a window for the passage of a desired acoustic wave form wherein a pair of structural septa laminately sandwich a core. The septa are formed of a material selected from a group consisting of (i) thermosetting plastics and thermoplastics all of which may be reinforced or unreinforced, (ii) low density, high modulus metals and metal alloys, and (iii) carbon composites.

The core is formed of a material having a static shear modulus of between about 200 psi (138 kPa) and about 15,000 psi (10.34×10⁴ kPa) and a Young's modulus of between about 600 psi (415 kPa) and about 50,000 psi (34.475×10⁴ kPa). The core material is possessed of an elongation to break of at least about 3% and a longitudinal velocity propagation characteristic for the sound frequencies being transmitted of between about 1200 and about 2000 meters per second. The septa and core together desirably define a thickness of about $\frac{1}{2}\lambda\pm25\%$ for the desired acoustic wave form being transmitted through the window.

A suitable sonar window in accordance with the invention is made for passing an acoustic wave form therethrough having a desired $\lambda$ at passage through the window of not less than about 0.001 meter and not more than about 1.5 meters by providing a pair of septa formed from material selected from a group consisting of: (i) thermosetting plastics and thermoplastics which may be reinforced or unreinforced, (ii) low density, high modulus metals and metal alloys, and (iii) carbon composites.

A core is provided laminately sandwiched between the septa and formed of a material selected from a group consisting of a material having a static shear modulus of between about 200 psi (138 kPa) and about 15,000 psi (10.34×10⁴ kPa) and a Young's modulus of between about 600 psi (415 kPa) and about 50,000 psi (34.475×10⁴ kPa). The core material is possessed of an elongation to break of at least about 3% and a longitudinal velocity propagation characteristic for the sound frequencies being transmitted of between about 1200 and about 2000 meters per second.

Desirably septa and core together are configured as a laminate to be more precisely $\frac{1}{2}$ in thickness of the desired acoustic wave form being transmitted The laminate of septa and core are then formed into a desired window physical configuration such as that of a bow dome, or other curvilinear shape for desired mating with a hull of a surface vessel or submarine.

The core preferably is formed of a natural or synthetic rubber, other elastomer, or castable filled or unfilled synthetic polymer having the desired physical and dynamic properties. The septa typically are formed of steel, titanium, aluminum, copper, nickel and alloys thereof, of a fiber reinforced thermosetting plastic or thermoplastic or of carbon composites.

The above and other features of the invention will become more apparent when considered in light of a description of a preferred embodiment of the invention, together with drawings that follows forming a part of the specification.

BEST EMBODIMENT OF THE INVENTION

The present invention provides a window for the passage of acoustic wave forms. The window of the invention is possessed of desirably enhanced attenuation and self damping properties.

Figure 1:
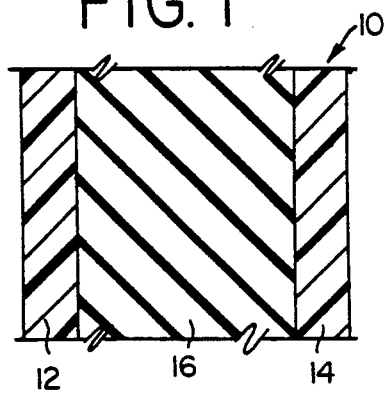
FIG. 1 is a cross-sectional representation of a portion of an acoustic window in accordance with the invention.

A window 10 in accordance with the invention is shown in FIG. 1. The window 10 consists of septa 12, 14 and a core 16. The window 10 of FIG. 1 is shown in cross section and is a representative cross section of a window-like sonar bow dome as might be associated with a submarine or surface vessel.

The window 10 is configured to separate sound wave transmitting or receiving equipment (not shown) from an open liquid (fresh or seawater) through which it is desired sound signals be transmitted or received. Such bow domes can have any suitable or conventional shape such as, generally elliptoidal, hyperbolic, circular and the like. Alternately, the acoustic window 10 can simply conform to a curvilinear portion of a vessel hull surface and thereby resemble in relatively flush appearance the installation of some windows in buildings and other land based structures. The particular physical form taken by such a window 10 in accordance with the invention in part will be a function of the particular acoustic wave form transmission/reception function to be provided by the acoustic wave form transmitter or receiver equipment positioned behind the window or within an enclosure at least partially defined by the window 10.

In the window 10 of the invention, the septa 12, 14 are formed of a suitable or conventional structural material. This material can be reinforced or unreinforced thermosetting plastic or reinforced or unreinforced thermoplastic. These septa 12, 14 alternately can be formed from a low density, high modulus metal or metal alloy. Alternately, the septa 12, 14 can be formed from carbon composites.

The selection of a particular material of construction for the septa 12, 14, will be, in part, a function of the structural integrity required in the resulting window 10 and the properties of acoustic clarity and freedom from acoustic distortion associated with the particular septum material employed.

Preferred in the practice of the invention are fitted, reinforced plastics and particularly so-called fiber reinforced plastics (FRP). Filler-reinforcements can include glass beads or spheres, carbon particulates, carbon or graphite fibers and other suitable or conventional filler materials. Most particularly glass fiber reinforced plastics find utility in the practice of the invention.

Such reinforced plastics are well known in industry and suitable or conventional such fiber reinforced plastics may be employed. Relatively greater strength per unit weight often is associated with FRP plastics made employing thermosetting resins such as epoxies or furanes, and these thermosetting FRP plastics are preferred in the practice of the invention. However it is anticipated that the evolution of thermoplastic materials such as polyetherethers (PEEK ®) could find increased utility in the formation of structures according to the instant invention. Other thermoplastics offering utility in the practice of the invention include polyethylene, polypropylene, vinyl chloride, chlorinated vinyl chloride, acrylonitrile-butadiene styrene copolymer, polyvinylidine fluoride, polytetrafluroethylene, polycarbonates, and other suitable or conventional thermoplastic resins.

The septa 12, 14 alternately can be formed of a metal. The metal preferably is a low density, relatively high modulus, metal or metal alloy. Particularly preferred in the practice of the invention is steel, titanium, aluminum, copper, stainless steel, magnesium, beryllium, nickel and alloys of these metals where appropriate. By low density, what is meant is generally a density of about 9 grams per cubic centimeter or less. By high modulus what is meant is generally a modulus of at least about $5 \times 10^6$ psi (34.47 $5 \times 10^6$ kPa).

As a further alternate, the septa 12, 14 can be formed of carbon composites. The carbon can be in graphite or non-oriented (base) carbon form and the composites may be formed in suitable or conventional well known fashion. One composite form is developed by laying up prepregged carbon fabric; and another by using a fiber-resin blend. Either may be subsequently charred to produce carbon. Densification in accordance with well known procedures and techniques such as carbon vapor infiltration or resin impregnation can be employed to strengthen and densify such carbon composite structure.

The materials selected for preparing a septum 12, 14 in accordance with the invention should have a tensile stiffness sufficient to support, in the septum thickness employed, anticipated stresses and strains upon the window 10 associated with operation in a submerged environment.

The core 16 is formed of a material having a static shear modulus of between about 200 psi (1380 kPa) and about 15,000 psi (103500 kPa) and a Young's modulus of between about 600 psi (4140 kPa) and about 50,000 psi (344750 kPa). The core material is possessed of an elongation to break of at least about 3% and the longitudinal velocity propagation characteristic for the acoustic wave form being transmitted through the window 10 of between about 1200 and abut 2000 meters per second.

By the term static shear modulus, what is meant is the modulus of elasticity in shear or a measure of a material's resistance to shearing stress, equal to the shearing stress divided by the resultant angle of deformation expressed in radians. Static shear modulus may also be known as co-efficient of rigidity, modulus rigidity, or shear modulus.

By the term Young's modulus as used herein, what is meant is the ratio of a simple tension stress applied to a material to the resulting strain parallel to the tension. The Young's modulus is also a measure of the modulus of the elasticity for the material which modulus of elasticity may also be known as the coefficient of elasticity, the elasticity modulus or the elastic modulus.

It is preferred that the core 16 be possessed of a longitudinal velocity propagation characteristic for the acoustic wave form being passed through the core 16 closely approximate that of the liquid medium or lower in which the window is immersed. As an illustration, where the medium liquid is water, the longitudinal velocity propagation characteristic preferably is about 1200–2000 m/sec.

Typically the core is formed of a natural or synthetic rubber or other elastomer but may be formed of castable, filled or unfilled synthetic polymers. Synthetic rubbers suitable for use in the practice of the instant invention include styrene-butadiene and acrylonitrile based rubbers, the latter being commonly known in the industry as nitrile rubbers. Chlorinated rubbers such as NEOPRENE ® find utility in forming the core 16. Other elastomers having utility in the practice of the invention include polyurethanes, polybutadienes and acrylic-copolymeric rubbers and EPDMS (ethylene propylene based polymers) By "rubber", what is meant is a vulcanized, or cross-linked rubber made according to suitable or conventional techniques. By "elastomer" what is meant is a material possessed of an ability to recover at least in part a former figure or shape upon removal of a figure or shape distorting force.

Castable polymers may be filled employing suitable or conventional materials. As an illustration, carbon black or glass fibers may be used as filling agents Castable filled or unfilled synthetic polymers suitable for use in the practice of the instant invention include polyurethanes and so-called reactive liquid polymers like those available from The B.F. Goodrich Company under the designations HYCAR ®.

The rubbers, and elastomers employed in the practice of the invention forming core 16 may include a filling agent. This filling agent, which may be present in a quantity of between zero and about 50 parts per hundred weight of elastomer or rubber and, generally is present in a quantity of between about 15 and 40 parts per hundred weight of elastomer or rubber. The filling agent may be a particulate such as carbon black, glass microspheres or microbeads or may be a fiber like additive such as mineral, polyester, polyolefin, polyaramid, polyamides and polyvinyls such as polyvinyl alcohol (1 mm-6 denier). The use of KETJEN ® commercially available carbon black in natural rubber at 40 parts carbon black per hundred parts natural rubber produces a core 16 having a Young's modulus of 2400 psi. The use of 20 parts per hundred weight KETJEN black in the same natural rubber while also employing 20 parts per hundred weight of 1 mm/6 denier polyvinyl alcohol produces a core material 16 having a Young's modulus of between 8000 ($5.516 \times 10^4$ kPa) and 12,000 ($8.274 \times 10^4$ kPa) psi While any suitable or conventional filling material for the rubbers or elastomers employed in forming the core 16 can be employed, the selection of a particular filling material will be at least in part determined by the longitudinal velocity propagation characteristics for acoustic waveforms desired in any resulting core 16 and by the desired modulus, static and Young's, it is desired be achieved in any resulting core 16.

It should be understood that other suitable or conventional material may be used for forming the core 16 providing the constraints regarding static shear modulus, Young's modulus, elongation to break, and longitudinal velocity propagation characteristic for acoustic wave forms through the material meet the criteria set forth herein.

It is preferred that the core material be possessed of static shear modulus of between about 3000 psi (20685 kPa) and about 15000 psi (103433 kPa), Young's modulus of between about 1000 psi (68950 kPa) and about 50,000 psi (344750 kPa) and an elongation to break of at least about 6%.

The materials preferably also are possessed of a loss tangent or loss factor of at least 0.05 or greater over the frequency range being transmitted in the temperature range in which the window is employed. This loss tangent is the ratio of the viscous modulus to the elastic modulus for the material. By viscous modulus what is meant is the modulus that is proportional to the deforming force that is not recovered or conserved and is observed only under dynamic stress.

By elastic modulus what is meant is the ratio of the increment of some specified form of stress to the increment of some specified form of strain, also known as the co-efficient of elasticity.

These elastic and viscous moduli are hereinafter referred to as dynamic moduli.

Use of cores 16 having these preferred static and dynamic properties produces a window having desirably enhanced critical damping properties which can function to reduce interfering noise signals inherent with conventional sonar windows.

Such noise can be engendered by vibrations established within the window 10 by transmitted acoustic wave forms arising from operation of machinery aboard a vessel embodying such a window. Alternately, the flow regime of fluid through which the window is moving during motion of any vessel with which the window is associated can engender a vibrational mode in the structure of the window 10 which can cause an acoustic wave form generation at frequencies which may be deleterious to the transmission and reception of acoustic wave form signals through the window 10. Whereas older windows formed from, for example, FRP may exhibit a typical critical damping factor of about 0.5%, windows 10 such as the window like domes shown in section in FIG. 1 and made in accordance with the instant invention typically demonstrate a critical damping factor of between 2% and 3%.

Figure 2:
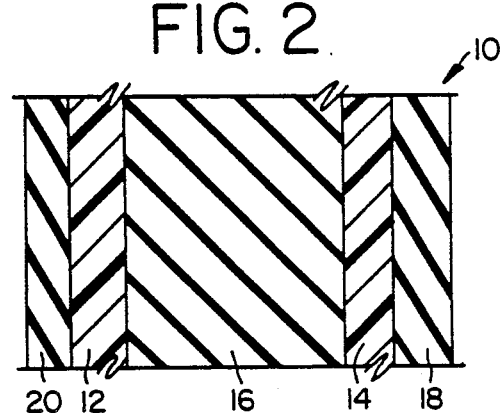
FIG. 2 is a cross-sectional representation of a portion of an acoustic window made in accordance with the invention.

An alternate preferred embodiment of the invention is shown in FIG. 2. In FIG. 2, structural portions of like identity to FIG. 1 bear like reference numerals. Referring to FIG. 2, a window 10 is shown having septa 12, 14 and a core 16. The septa on surfaces not in contact with the core 16 are covered with a coating or layer 18, 20 of a synthetic or a natural rubber or other elastomer. The coating can vary in thickness from between about 1/16 of an inch (0.16 cm) to about 1 inch (2.54 cm). The elastomer preferably contains a suitable or conventional biologically active agent configured for retarding the formation of biofouling upon the layers, 18, 20. Conventional biofouling retarding compounds are well known. A suitable synthetic rubber for use in forming the layers 18, 20 is available from The B.F. Goodrich Company under the designation NO FOUL ®.

In the embodiment of FIGS. 1 and 2, the septum 12, 14 are laminably affixed to the core 16. Depending upon the materials forming the core 16 and the septa 12, 14, laminable affixation can be accomplished employing adhesive techniques or polymeric cross-linking techniques such as vulcanization or other chemical cross-linking. The particular technique for forming the laminating bond between core 16 and septa 12, 14 typically is selected in view of the chemical nature of the particular materials forming the septa 12, 14 and the core 16. It is important that the septa 12, 14 and the core 16, be in laminate contact for acoustic wave transmission across the interface between the septa and the core to avoid distortion and signal attenuation of the acoustic wave forms being transmitted. Likewise, the coverings or layers 18, 20 are applied to the septa 12, 14 employing adhesive, vulcanizing, other cross-linking techniques or other suitable or conventional techniques. Such techniques are known in the art.

The thickness of the window 10 as depicted in either FIG. 1 or FIG. 2 is a function of the structural strains and stresses which the window must withstand in service and of the wave number or wave length of the acoustic wave forming being passed through the window 10 for transmittal or receipt. It is desirable that the window measured from outer surface of one septum 12 to the outer surface of the other septum 14 be of an acoustic thickness of approximately one half the wave length of the acoustic wave form passing through the window, ±25%. More preferably this acoustic thickness is $\lambda \pm 15\%$. The core 16 can be adjusted in thickness to provide this desirable half-wave thickness. Adjustment of the articular core thickness can also be assisted through judicious selection of particular materials for forming the core having desirably elevated or reduced longitudinal velocity propagation characteristics for the acoustic wave form being passed through the core. Typically, a core material having a lower longitudinal velocity propagation characteristic may be made thinner than one having a more elevated wave form longitudinal velocity propagation characteristic.

Figure 3:
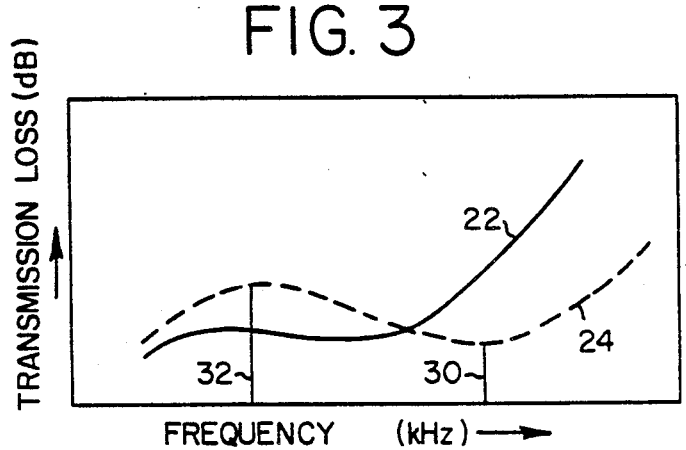
FIG. 3 is a graphical representation of acoustical transmission performance properties of acoustic wave form window structures as a function of frequency of the wave form being transmitted through the window.

The effects of tuning of the combined acoustic thicknesses of septum and core in the window 10 of the invention to the half-wave thickness can be seen in reference to FIG. 3. FIG. 3 is a graphical representation of attenuation loss in decibels as a function of frequency in hz. Curve 22 and curve 24 represent the acoustic performance of windows 10 formed of identical septum thicknesses and materials. Curve 24 represents a window 10 having a core 16 thinner than the core represented by curve 22 by a factor of about 2.

The curve 24 indicates superior performance characteristics measured by signal reduction for a thinner core 16 but that, surprisingly, the thinner core performs less well with respect to such reduction at lower frequencies. Accordingly, where very true transmission of a particular frequency across the window 10 is desired, a combination of septum and core thicknesses and materials can be selected and tailored to provide desirably low signal reductions. It is important to note that the window 10 represented by the performance curve 24 is less stiff from a flexural standpoint than the window represented by the performance curve 22.

Figure 4:
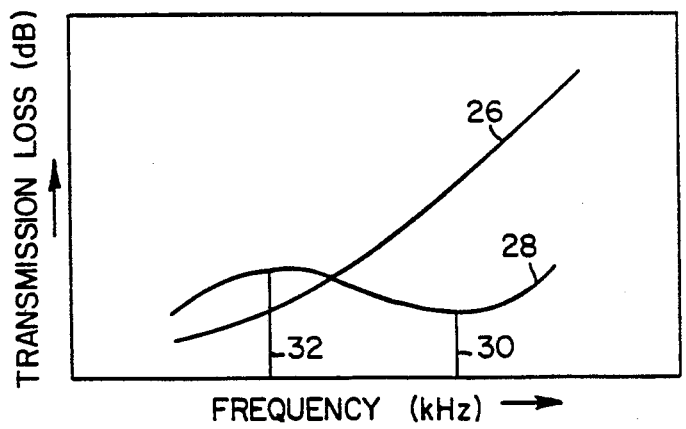
FIG. 4 is a graphical representation of transmission loss or attenuation of an acoustic wave form signal as a function of frequency.

Referring to drawings, FIG. 4 is a graphical representation of signal reduction plotted as a function of frequency in hertz. The curve 26 represents the signal reduction performance characteristics of a window formed of 1¼' homogeneous glass reinforced plastic (GPR). The polymer binder used in forming the glass reinforced plastic was epoxy 121° C. cure. Conversely, the curve 28 depicts signal reduction for a window structure in accordance with the invention having glass reinforced polymer septa 12, 14 formed of the same glass reinforced polymer as the window represented by the curve 26 except for each septum 12, 14 being 0.5 inches (1.27 cm) in thickness and a core formed of natural rubber, 2.5 inches (6.35 cm) in thickness.

The performance indicated by the curve 28 displays a regional minimum signal reduction at a half-wave frequency 30 and a regional maximum signal reduction at a quarter wave frequency 32. Conversely, the conventional GRP window as represented by the curve 26 displays steadily increasing signal reduction as a function of frequency. Like other conventional windows, the GRP window represented by the curve 26 is not significantly "tunable" as are the windows of Applicant's invention.

The presence or absence of coating layers 18, 20 as shown in FIG. 2 does not appear to affect materially the performance of the windows 10 of the invention. The acoustic performance of the windows of the invention appears to be established by the thickness of each of the septum 12, 14 and the thickness and other physical parameters of the core 16 and is significantly influenced by the longitudinal velocity propagating characteristic associated with the materials selected for forming these elements 12, 14, 16. The magnitude of any transmission loss through the septa 12, 14 and the core 16 is controlled primarily by the density, thickness, and longitudinal velocity propagation characteristics of the septa 12, 14 and the core 16 and by the longitudinal loss factor of the core. This longitudinal loss factor is inherent in the materials selected for forming the core and the selection of a material having a particularly desirable longitudinal loss factor is a matter of trial and error. Nitrile rubbers, and synthetic butadiene based rubbers together with natural rubber are possessed of particularly attractive longitudinal loss factors where used in practicing the invention. Desirable structural and acoustical properties in core 16 materials typically are in opposition, the structural properties in configuring a window 10 in accordance with the invention being controlled by the thickness, tensile, and compression moduli of the septa and by the thickness and shear modulus of the core.

EXAMPLE 1

Figure 5:
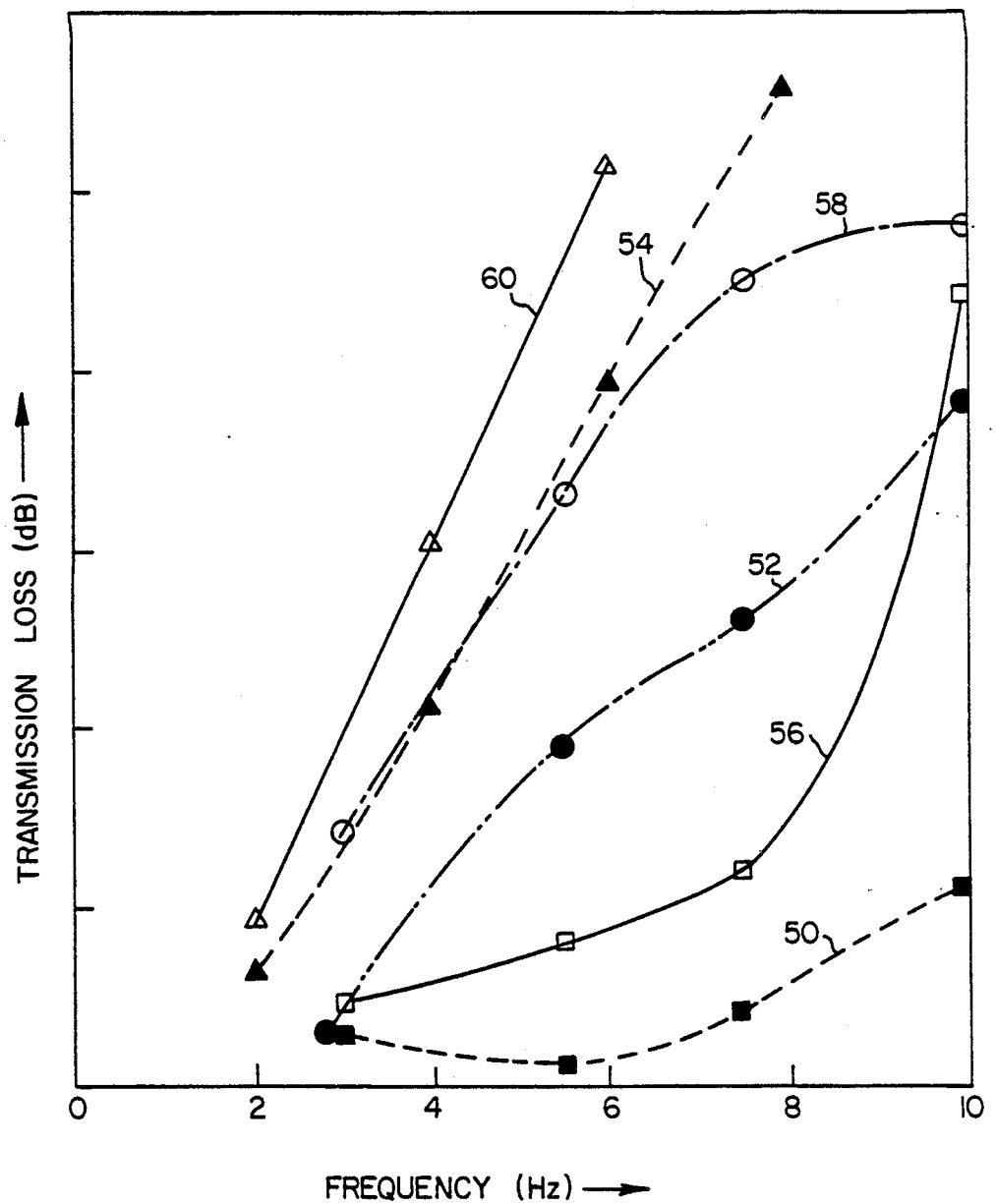
FIG. 5 is a graphical representation of acoustical transmission performance of various dome configurations as loss plotted as a function of frequency.

A window 10 in accordance with FIG. 2 was prepared by forming septa 12, 14 from glass fabric prepregged with 121° C. cure epoxy in a thickness of one quarter inch (0.630 cm) each. The core was formed from natural rubber, 2½ inches (6.35 cm) in thickness. The covering layers 18, 20 were formed from B.F. Goodrich NOFOUL rubber in a thickness of 1¼ inches (3.18 cm). When subjected to acoustic transmission clarity testing and acoustic transmission loss testing, the structure formed in this Example 1 yielded the performance curve set forth as curve 50 in FIG. 5. By contrast the performance of 1¼ inch thick GRP (3.175 cm) is plotted on curve 52 and ½ inch (1.27 cm) steel is plotted on curve 54. In FIG. 5, the abcissa plots frequency in Hz and the axis plots loss in decibels. Performance was determined on 5 foot×5 foot (1.52 m) panels at 21.6° C. The structure produced in Example 1 was then duplicated, with the septa again being formed of epoxy glass but ⅜ inches (1.27 cm) in thickness and the NOFOUL ½ inch (1.27 cm) in thickness. When subjected to loss testing, the performance of this second structure is characterized by the curve 56. For comparison the performance of 2.1 inch thick GRP (5.3345 cm) is shown by curve 58 and the performance of ⅝" steel (1.59 cm) is shown by the curve 60. Testing conditions and panel size remained unchanged.

Windows in accordance with the invention can be "tuned" by selection of septa 12, 14 and core 16 thicknesses and materials to accommodate a wide range of acoustical frequencies. This selection naturally requires at the onset a certain trial and error effort. Acoustic waveforms of frequency of at least about 500 hz but less than about 50 khz can be accommodated with surprising clarity and freedom from attenuation and distortions while providing desirable structural strength in the windows 10.

The laminate structure of the invention having a core material possessed of lower static and dynamic moduli than conventional window construction materials, all as set forth herein, permits a dynamic decoupling of the laminate layers 12, 14, 16 in the presence of vibrations often engendered by passage of the window through the fluid in which it is employed or by transmitted structural vibrations originating in the vessel conveying the window. This decoupling tends to reduce substantially the radiated noise corresponding to this "in use" phase of the window. Yet, absent these in use vibrations, the window remains "hard", that is dynamically decoupled and thereby structurally "stiff". This decoupling is particularly effective in the range of frequencies of about 1 khz to about 20 khz.

While a preferred embodiment of the invention has been shown and described in detail it should be apparent that various modifications may be made thereto without departing from the scope of the claims that follow.

What is claimed is:

1. A window for the passage of desired acoustic wave form comprising:
   a pair of septa formed of a material selected from a group consisting of: (i) reinforced and unreinforced thermosetting plastics and thermo plastics; (ii) low density, high modulus metals, metal alloys; and (iii) carbon composites;
   a core laminatably sandwiched between the septa, the core being formed of a material having a static shear modulus of between about 200 and about 15,000 psi, a Young's modulus of between about 600 and about 50,000 psi, an elongation to break of at least about 3%, and a longitudinal velocity propagation characteristic for the acoustic waveform of between about 1200 and about 2000 meters/sec;
   the septa and core together defining a thickness of $\frac{1}{2}\lambda \pm 25\%$ for the desired acoustic waveform.

2. The window of claim 1, the acoustic waveform having a $\lambda$ of at least about 0.001 meters and less than about 1.5 meters.

3. The window of claim 1, the core material being selected from a group consisting of natural and synthetic rubbers, elastomers, and castable filled and unfilled synthetic polymers.

4. The window of claim 3, the core material having a static shear modulus of between about 3000 and about 15000 psi, a Young's modulus of between about 10000 and about 50000 psi and an elongation to break of at least about 6%.

5. The window of claim 4, the window having a structural configuration of a dome.

6. A window for the passage of desired acoustic waveform having a $\lambda$ of at least about 0.001 and less than about 1.5 meters in a water environment comprising:
   a sandwich formed of a core laminated between a pair of septa, the septa being formed of a material selected from a group consisting of: (i) reinforced and unreinforced thermosetting plastics and thermoplastics; (ii) low density, high modulus metals selected from a group consisting of steel, aluminum, titanium, stainless steel, copper, nickel, beryllium, magnesium, and alloys thereof; and (iii) carbon composites; the core being formed from a material having a static shear modulus of between about 200 and about 15000 psi, a Young's modulus of between about 600 and about 50000 psi and elongation to break parameter of at least about 5% and a longitudinal velocity propagation characteristic for a desired acoustic wave form of between about 1200 and about 2000 meters per second; the sandwich defining a thickness of about $\frac{1}{2}\lambda \pm 25\%$ for the desired acoustic wave form; the core material being selected from a group consisting of natural and synthetic rubbers, elastomers, and filled and unfilled castable synthetic polymers.

7. The window of claim 6, the core material having a static shear modulus of between about 3000 and about 15000 psi, a Young's modulus of between about 10000 and about 50000 psi, and an elongation to break of at least about 6%.

8. The window of claim 7, the core being formed from material selected from a group consisting of natural rubber, styrene-butadiene rubber, acrylonitrile-butadiene rubber, chlorinated rubbers, castable polyurethanes, and cast reactive liquid polymers.

9. The window of claim 8, the core material being filled with a filler selected from a group consisting of mineral, polyester, polyolefin, polyaramid, glass, polyvinyls and polyamide fibers and carbonaceous particulates and microspheres.

10. The window of claim 6, the window having a structural configuration of a dome.

11. The window of claim 8, the window having a configuration of a dome.

12. The window of claim 6, a surface of each of the septa obverse to the septum surface laminated to the core being covered with an effective thickness of a material selected from a group consisting of natural rubbers, styrene-butadiene rubbers, acrylonitrile butadiene rubbers, and chlorinated rubbers, the covering thickness including within the rubber a biologically active agent in a quantity sufficient to suppress biofouling of the window.

13. The window of claim 1, a surface of each of the septa obverse to the septum surface laminated to the core being covered with an effective thickness of a material selected from a group consisting of natural rubbers, styrene-butadiene rubbers, acrylonitrile butadiene rubbers, and chlorinated rubbers, the covering thickness including within the rubber a biologically active agent in a quantity sufficient to suppress biofouling of the window.

14. A method for making a window for the passage of a desired acoustic waveform having a desired $\lambda$ of less than about 1.5 and at least about 0.001 meters during immersion of the window in a liquid comprising the steps of:

providing a pair of septa formed of a material selected from a group consisting of: (i) reinforced and unreinforced thermosetting plastics and thermoplastics; (ii) low density, high modulus metals selected from a group consisting of steel, aluminum, titanium, stainless steel, copper, nickel, beryllium, magnesium, and alloys thereof; and (iii) carbon composites; and a sandwiched core therebetween formed from material having a static shear modulus of between about 200 and about 15,000 psi, a Young's modulus of between about 600 and about 50000 psi an elongation to break parameter of at least about 5% and a longitudinal velocity propagation characteristics for the desired acoustic wave form of between about 1200 and about 2000 meters per second; the sandwich defining a thickness of about $\frac{1}{2}\lambda \pm 25\%$ for the desired acoustic wave form; the core material being selected from a group consisting of natural and synthetic rubbers, elastomers, and filled and unfilled castable synthetic polymers configuring the septa and core, as a laminate to be $\frac{1}{2}\lambda \pm 25\%$ of the desired waveform in thickness; and forming the laminate septa and core into a desired physical configuration.

15. The method of claim 14, the core material being selected to be possessed of a static shear modulus of between about 3000 and about 15,000 psi, a Young's modulus of between about 15000 and about 50,000 psi, and an elongation to break of at least about 6%.

16. The method of claim 15, the core material being selected from a group consisting of natural rubber, styrene-butadiene rubber, acrylonitrile-butadiene rubber, chlorinated rubbers, castable polyurethanes, and cast reactive liquid polymers.

17. The method of claim 14, the thickness of the laminate being configured to be one half $\lambda$, $\pm 15\%$.

18. The method of claim 14, including the step of forming the laminate septa and core into a sonar dome.

19. The dome of any one of claims 1–13 the dome being configured to dynamically decouple in the presence of vibrations having a frequency of between about 1 khz and 20 khz.

* * * * *